United States Patent
Roberts et al.

(10) Patent No.: US 8,411,258 B2
(45) Date of Patent: Apr. 2, 2013

(54) SYSTEMS AND METHODS FOR DETERMINING POSITION USING LIGHT SOURCES

(75) Inventors: Richard D. Roberts, Hillsboro, OR (US); Praveen Gopalakrishnan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/975,451

(22) Filed: Dec. 22, 2010

(65) Prior Publication Data

US 2012/0162633 A1 Jun. 28, 2012

(51) Int. Cl.
G01C 3/08 (2006.01)

(52) U.S. Cl. ............ 356/5.09; 356/3.01; 356/4.01; 356/5.01; 356/5.1

(58) Field of Classification Search .......... 356/5.09, 356/3.01–3.15, 4.01–4.1, 5.01–5.15, 6–22, 356/28, 28.5, 139.01–139.1
See application file for complete search history.

(56) References Cited

U.S. PATENT DOCUMENTS

| | | | |
|---|---|---|---|
| 5,081,344 A | 1/1992 | Misawa | |
| 5,119,104 A * | 6/1992 | Heller | 342/450 |
| 5,914,687 A * | 6/1999 | Rose | 342/442 |
| 5,915,233 A | 6/1999 | Nonaka et al. | |
| 6,031,600 A | 2/2000 | Winner et al. | |
| 6,801,782 B2 * | 10/2004 | McCrady et al. | 455/517 |
| 7,132,981 B1 | 11/2006 | Roberts | |
| 7,292,631 B2 | 11/2007 | Gregorius | |
| 2001/0053699 A1 | 12/2001 | McCardy et al. | |
| 2004/0247025 A1 | 12/2004 | Gregorius | |
| 2006/0094350 A1 | 5/2006 | Ishimura et al. | |
| 2006/0132353 A1 | 6/2006 | Natsume et al. | |
| 2006/0285102 A1 * | 12/2006 | Aoki et al. | 356/5.1 |
| 2007/0102619 A1 * | 5/2007 | Kusaka | 250/201.2 |
| 2007/0296951 A1 * | 12/2007 | Kuijk et al. | 356/5.02 |
| 2008/0108372 A1 * | 5/2008 | Breed | 455/456.1 |
| 2009/0134918 A1 | 5/2009 | Tzeng | |
| 2009/0243679 A1 | 10/2009 | Smith et al. | |
| 2009/0251976 A1 | 10/2009 | Amarilio et al. | |

(Continued)

OTHER PUBLICATIONS

Klym, Natalie, Fine, Charlie, The Evoltion of RFID Networks: The Potential for Distruptive Innovation, VCDWG, CFP, Cambridge University Communications Research Network, Mar. 2006.*

(Continued)

*Primary Examiner* — Luke Ratcliffe
(74) *Attorney, Agent, or Firm* — Grossman, Tucker, Perreault & Pfleger, PLLC (57) ABSTRACT

A positioning system and method for determining a coordinate of an object may comprise a positioning transmitter system and a positioning receiver system. The positioning transmitter system includes at least four light sources and a master anchor to modulate the light sources to emit modulated light signals each having a modulation frequency. The positioning receiver system comprises a lens to focus the light signals onto an optical sensor, an envelope detector to receive a signal from the optical sensors and provide output signals corresponding to the modulation frequency, and positioning detection circuitry. The positioning detection circuitry receives calibration data; determines at least four phase difference of arrival (PDOA) pairs based on the output signals from the envelope detector; determines at least four phase corrected PDOA pairs based on the calibration data and the PDOA pairs; determines at least four linear distance differences based on the phase corrected PDOA pairs; and determines the coordinate of the object based on the linear distance differences and the calibration data.

20 Claims, 5 Drawing Sheets

U.S. PATENT DOCUMENTS

| | | |
|---|---|---|
| 2010/0067633 A1 | 3/2010 | Den |
| 2010/0156459 A1 | 6/2010 | Plants et al. |
| 2010/0225370 A1 | 9/2010 | Demone |
| 2011/0018601 A1 | 1/2011 | Yoshizawa et al. |
| 2011/0074477 A1 | 3/2011 | Nagarajan et al. |
| 2011/0144941 A1* | 6/2011 | Roberts et al. ............... 702/152 |
| 2011/0148486 A1 | 6/2011 | Mosalikanti et al. |
| 2011/0261347 A1* | 10/2011 | Kassamakov et al. .......... 356/51 |

OTHER PUBLICATIONS

Bucher, et al., "A Synthesizable VHDL Model of the Exact Solution for Three-Dimensional Hyperbolic Positioning System", VLSI Design, 2002, vol. 15 (2), pp. 507-520.

U.S. Office Action dated Dec. 16, 2011 issued in related U.S. Appl. No. 12/640,842 (7 pages).

Notice of Allowance Received for the U.S. Appl. No. 12/639,236 mailed on Aug. 21, 2012, 10 pages.

International Search Report and Written Opinion received for PCT application No. PCT/US2011/065866, mailed on Sep. 14, 2012, 15 Pages.

Wen, et al., "Distance Estimation Using Bidirectional Communications Without Synchronous Clocking", 2006, pp. 2-4.

Non Final Office Action Received for the U.S. Appl. No. 12/639,236, mailed on Apr. 30, 2012, 11 pages.

Notice of Allowance Received for the U.S. Appl. No. 12/640,842 mailed on Apr. 30, 2012, 7 pages.

* cited by examiner

SYSTEMS AND METHODS FOR DETERMINING POSITION USING LIGHT SOURCES

FIELD

The present disclosure generally relates to systems and methods for position detection, and more particularly, relates to systems and methods for position detection using a plurality of overhead light sources.

BACKGROUND

Systems have been developed to determine a position of an object using satellite-based global positioning system (GPS) information. Unfortunately, satellite-based GPS generally does not work unless the object can receive the necessary number of signals from the satellites. As such, satellite-based GPS may not reliably work indoors or any place where overhead obstacles (for example, but not limited to, roofs, buildings, trees, signs, or the like) may block satellite-based signals.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

In general, the present disclosure includes systems and methods for determining the position of an object using a plurality of signals generated from a plurality of light sources. According to one exemplary embodiment, the light sources may include, but are not limited to, a plurality of overhead light emitting diodes (LEDs) which may emit light (for example, but not limited to, light having a wavelength in the visible spectrum) that is modulated at a specific frequency. The object may receive the modulated light from the plurality of light sources and determine a plurality of phase difference of arrivals (PDOA) pairs, which may be translated into a plurality of linear distance difference pairs. These linear distance difference pairs may then be used to determine a position $<x, y, z>$ of the object. The position $<x, y, z>$ of the object may be a relative position (e.g., but not limited to, a position relative to the light sources, room, building, etc.) and/or an absolute position (e.g., but not limited to, a position relative to the Earth) as discussed herein.

Figure 1:
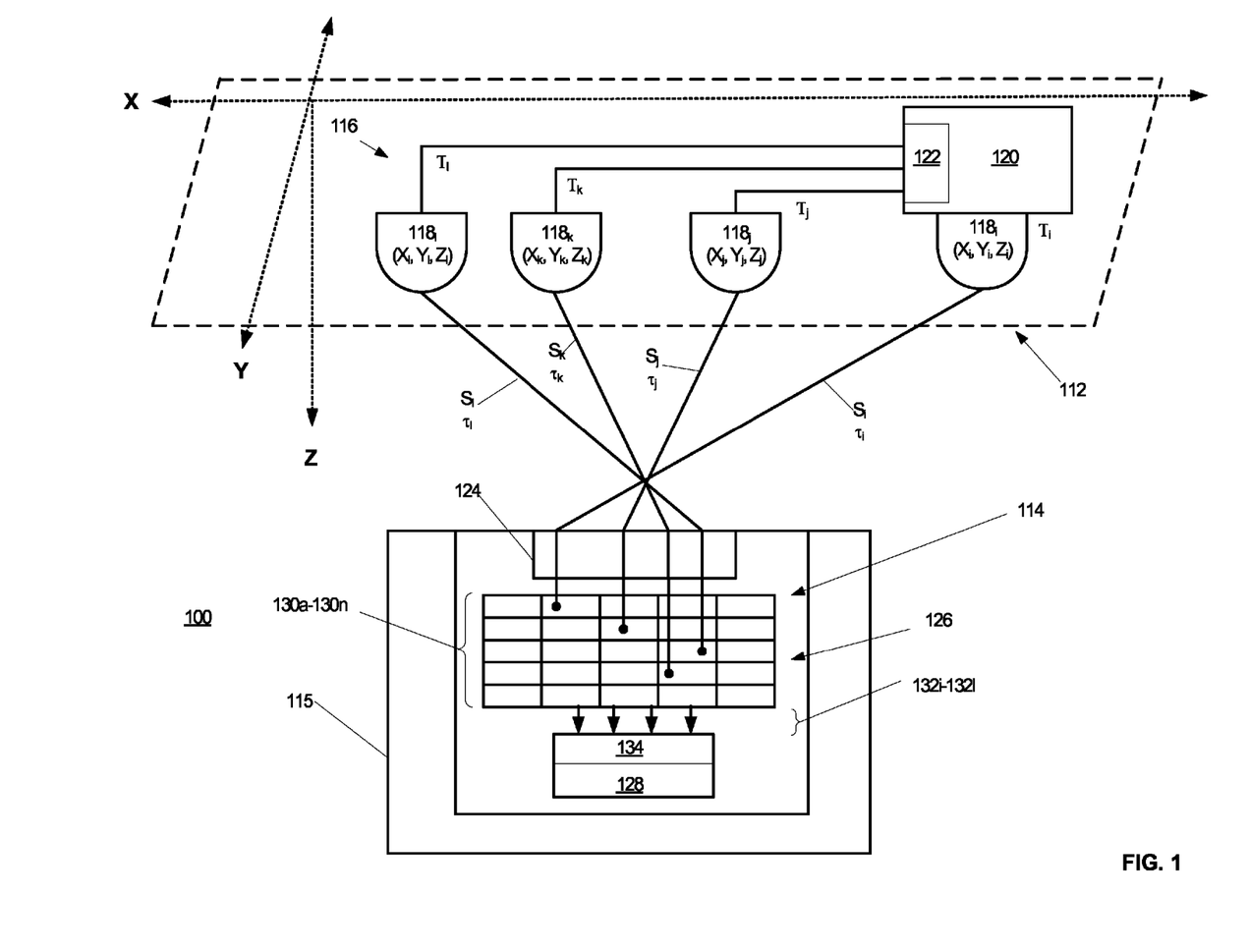
FIG. 1 illustrates one example system embodiment consistent with the present disclosure.

Turning now to FIG. 1, one embodiment of a positioning system 100 consistent with at least one embodiment of the present disclosure is generally illustrated. The positioning system 100 may include a positioning transmitter system 112 configured to transmit a plurality of signals $S_i$-$S_j$ and a positioning receiver system 114 configured to receive the signals $S_i$-$S_j$ and determine a position $<x, y, z>$ of an object 115.

The positioning transmitter system 112 may include a lighting system 116 (for example, but not limited to, an overhead lighting 116) having a plurality of light sources 118*i*-118*l*. The light sources 118*i*-118*l* may including any type of light source including, but not limited to, an incandescent light, high-intensity discharge (HID) light, fluorescent light, and solid-state light. The light sources 118*i*-118*l* may emit light in any spectrum including, but not limited to, infrared, visible, and/or ultraviolet wavelengths. According to the exemplary embodiment, the light sources 118*i*-118*l* may include at least four light emitting diodes (LEDs) emitting light having a wavelength in the visible spectrum; however, the light sources 118*i*-118*l* are not limited to LEDs operating in the visible spectrum unless specifically claimed as such.

The light sources 118*i*-118*l* may be controlled by one or more master anchors 120. The master anchor 120 may modulate the light sources 118*i*-118*l* at one or more frequencies. When the light system 116 is intended to operate in the visible light spectrum, the modulation frequency may be selected to minimize any perceived flickering. For example, the master anchors 120 may modulate the light sources 118*i*-118*l* at a frequency of 10 MHz or greater; however, one of skill in the art will recognize that the master anchors 120 may module the light sources 118*i*-118*l* at other frequencies. The upper limit for the modulation frequency may be selected based on the desired maximum resolution for the positioning system 100.

For example, the upper bound on the modulation frequency wavelength may be selected such that the distance between any pair of light sources 118*i*-118*l* does not exceed ½ wavelength where wavelength=speed of light/frequency. By way of example, if the light sources 118*i*-118*l* are 1 meter apart, then the upper frequency may be 150 MHz. However, from a practical perspective, the reaction time of the light sources 118*i*-118*l* may be the limiting factor. The master anchor 120 may include at least one oscillator, or the like 122 which modulates the light sources 118*i*-118*l* at the desired frequency(s).

Each light source 118*i*-118*l* may have a position $(X_n, Y_n, Z_n)_{i-j}$ which may be used to determine the position of the positioning receiver system 114, and therefore the position of the object 115. The positions $(X_n, Y_n, Z_n)_{i-j}$ of the light sources 118*i*-118*l* may be relative positions and/or absolute positions. As used herein, the phrase "relative position" is intended to mean a position relative to light system 116, the room/area containing the positioning system 100, and/or a building in which the positioning system 100 is located. Additionally, as used herein, the phrase "absolute position" is intended to mean a position relative to the Earth (e.g., a longitude and latitude).

Because the light sources 118*i*-118*l* are spaced apart from the master anchor 120, the lighting system 116 will have a distribution delay $T_n$ associated with each light source 118*i*-118*l*. In particular, each light source 118*i*-118*l* will have an associated distribution delay $T_i$-$T_j$ corresponding to the delay between when the master anchor 120 transmits the timing signal to each light source 118*i*-118*l* and when each light source 118*i*-118*l* emits light. The distribution delay for each light source 118*i*-118*l* may be based on, for example, the distance between the master anchor 120 and each light source 118i-118l and the time it takes for the timing signals to reach each light source 118i-118l, as well as the response time of each light source 118i-118l.

The positioning transmitter system 112 may be configured to transmit calibration data to the positioning receiver system 114. The calibration data may include a source identifier (which uniquely identifies each particular light source 118i-118l), a distribution delay $\theta_i$-$\theta_j$ associated with a particular light source 118i-118l, the position of the particular light source 118i-118l (e.g., relative and/or absolute position), and optionally the modulation frequency ($\omega_{ook}$) of the particular light source 118i-118l. The calibration data may be contained in the payload of a packet (which may also include, for example, a preamble and one or more headers). The packets may be transmitted by the positioning receiver system 114 periodically, upon system initialization, randomly, or upon request by the position receiver system 114. As described herein, the positioning transmitter system 112 may then utilize the calibration data to make phase corrections to the received signals $S_i$-$S_l$ as well as to determine the position of the positioning receiver system 114.

The positioning receiver system 114 may receive the signals $S_i$-$S_l$ emitted from the light sources 118i-118l, as well as the calibration data, and determine a position of the positioning receiver system 114 (and ultimately the object 115) based, at least in part, on the signals $S_i$-$S_l$. According to one embodiment, the positioning receiver system 114 may be a stand-alone device. Alternatively, the positioning receiver system 114 may also be part of the object 115 which may include a mobile device (such as, but not limited to, a mobile phone, smart phone, a laptop, a notebook, an ultra mobile pc (UMPC), a handheld computing device, a game console, a multimedia appliance, a digital recording device for audio/video, a netbook computer system, or the like) and/or robotic device.

The positioning receiver system 114 may include at least one lens 124, image array 126, and position detection circuitry 128. The lens 124 may be configured to focus each of the received signals $S_i$-$S_l$ onto a unique one of the pixels 130a-130n in the image array 126. For example, the lens 124 may be configured to map each light signal $S_i$-$S_l$ to a unique pixel based upon the angle of arrival of the light signal $S_i$-$S_l$. The image array 126 may then convert the received light signals $S_i$-$S_l$ into electrical signals 132i-132l which correspond to the light signals $S_i$-$S_l$. The electrical signals 132i-132l may then be processed by the position detection circuitry 128 to determine the position of the positioning receiver system 114. The positioning receiver system 114 may optionally include signal conditioning circuitry 134 which may, for example, include an envelope detector, frequency filter (such as, but not limited to, a low pass filter or the like) to reduce and/or eliminate noise. According to one embodiment, the positioning receiver system 114 may include four signal conditioning circuitries 134 associated with each of the light signals $S_i$-$S_l$.

Figure 2:
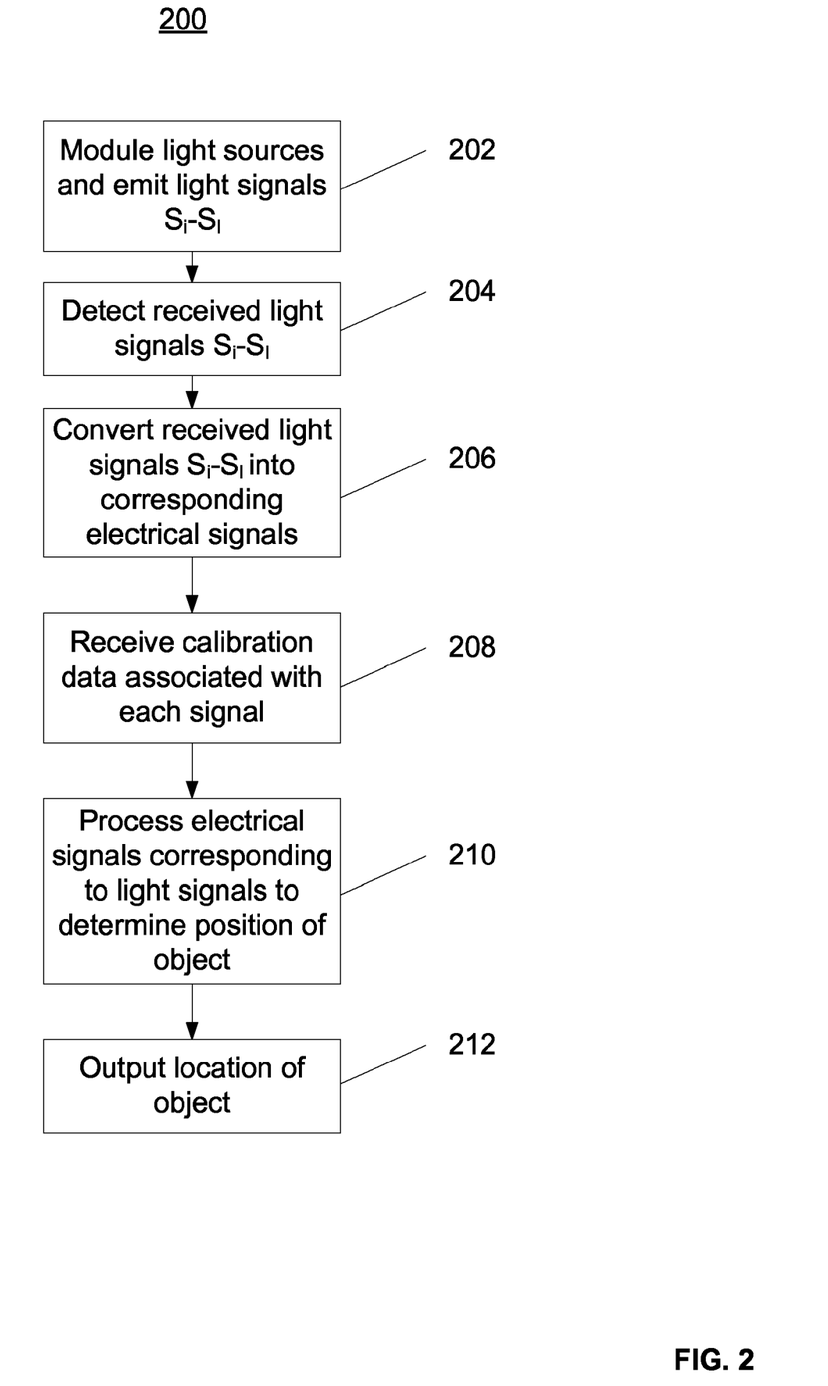
FIG. 2 illustrates a flow chart of example operations for determining a position of an object consistent with the present disclosure.

Turning now to FIG. 2, a flow chart 200 illustrating exemplary operations consistent with the present disclosure is shown. The operations of flow chart 200 may be performed by the positioning system 100. At operation 202, at least four light sources 118i-118l may be modulated (e.g., keyed on/off) at a predetermined modulation frequency to emit at least four modulated light signals $S_i$-$S_l$. At operation 204, the light signals $S_i$-$S_l$ may be detected by the positioning receiver system 114. For example, the light signals $S_i$-$S_l$ may be focused onto one or more optical sensors including, but not limited to, an image array 126 or the like. When the positioning receiver system 114 may receive more than four light signals S, the position detection processor 128 may be configured to select the most geometrically distinct/diverse light signals $S_i$-$S_l$ (i.e., the four signals $S_i$-$S_l$ corresponding to the light sources 118i-118l having the largest spacing between the light sources 118i-118l). Selecting the most geometrically distinct/diverse light signals $S_i$-$S_l$ may allow the positioning receiver system 114 to have the best geometric dilution of precision (GDOP), thereby increasing the performance of the positioning receiver system 114.

At operation 206, the light signals $S_i$-$S_l$ may be converted into electrical signals corresponding to the light signals $S_i$-$S_l$. For example, the output of the image array 126 may be received by an envelope converter of the signal conditioning circuitry 134 which may output electrical signals representative of each of the received light signals $S_i$-$S_l$.

At operation 208, calibration data associated with each light source 118i-118l may be received by the positioning receiver system 114. The calibration data may include, for example, a source identifier (which uniquely identifies each particular light source 118i-118l), a distribution delay $T_i$-$T_l$ associated with a particular light source 118i-118l, the position $<x_n, y_n, z_n>$ of the particular light source 118i-118l (e.g., relative and/or absolute position), and optionally the modulation frequency ($\omega_{ook}$) of the particular light source 118i-118l. The position detection processor 128 may be configured to identify and select the most geometrically distinct/diverse light signals $S_i$-$S_l$ based on, at least in part, the position $<x_n, y_n, z_n>$ of each light source 118i-118l. In addition, the position detection processor 128 may also consider the strength of the light signals $S_i$-$S_l$ when identifying and selecting the most geometrically distinct/diverse light signals $S_i$-$S_l$. One of ordinary skill in the art may appreciate that the order in which operation 208 is performed is not limited to the order illustrated in FIG. 2.

The positioning transmitter system 112 and the positioning receiver system 114 may have a default (e.g., predetermined modulation frequency), and as such, the positioning transmitter system 112 may not need to transmit the modulation frequency with the calibration data. Alternatively, each positioning transmitter system 112 may utilize a different modulation frequency, and therefore the positioning transmitter system 112 may include the modulation frequency with the calibration data that is associated with the particular positioning transmitter system 112.

At operation 210, the electrical signals corresponding to the received light signals $S_i$-$S_l$ may be processed (for example, by position detection circuitry 128) to determine the position of the object 115, for example by determining phase difference of arrival (PDOA) pairs ($\phi_{\Delta ji}, \phi_{\Delta ki}, \phi_{\Delta kj}, \phi_{\Delta lj}$) which in turn may be used to determine linear distance difference $R_{ji}, R_{ki}, R_{kj}, R_{lj}$), and ultimately the receiver position $<x, y, z>$ (e.g., the object 115) using multilateration calculations. At operation 212, the receiver position $<x, y, z>$ may be outputted from the position detection circuitry 128.

Figure 3:
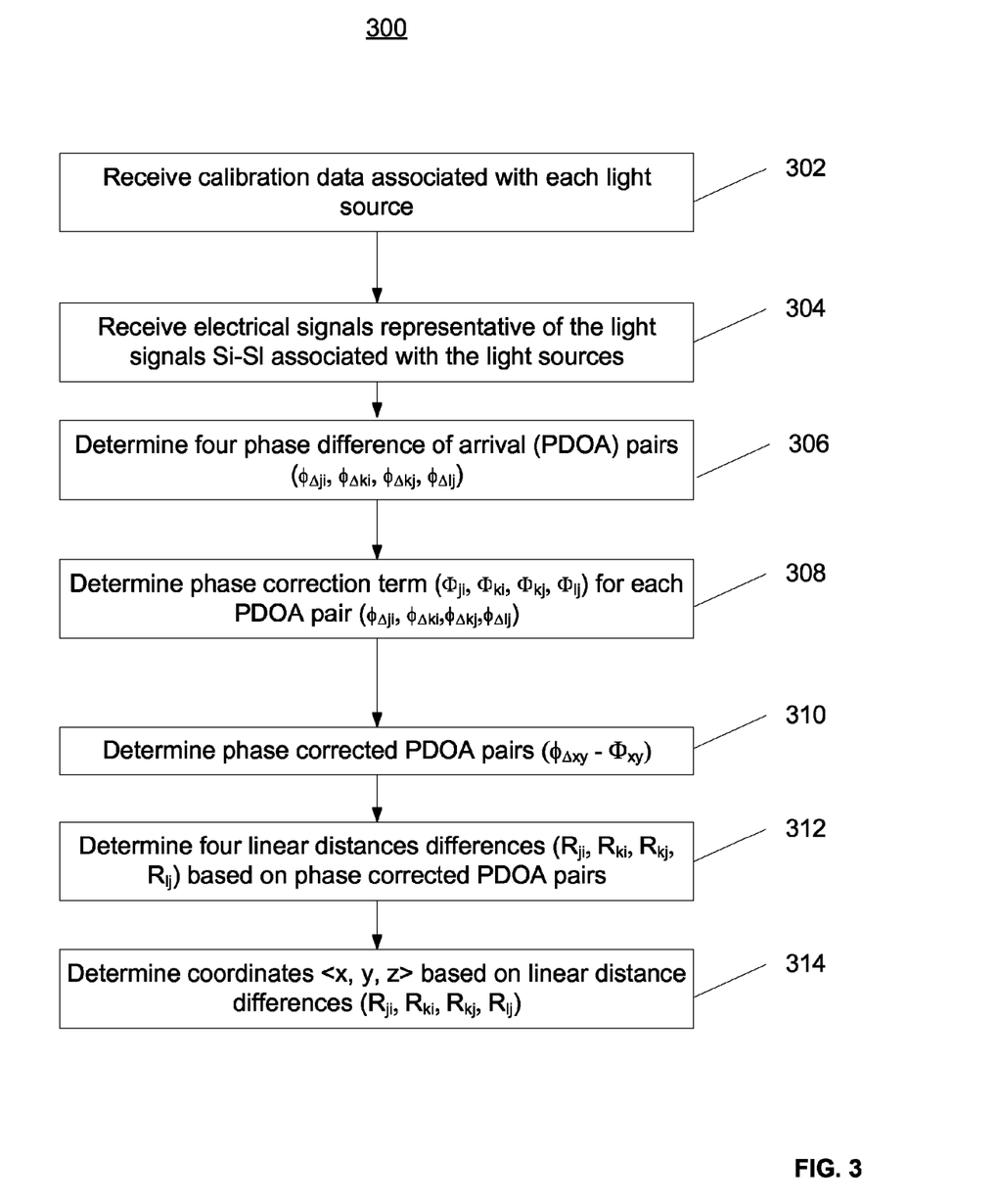
FIG. 3 illustrates a flow chart of example operations for processing the signals to determine a position consistent with the present disclosure.

Turning now to FIG. 3, a flow chart 300 illustrating the exemplary operations of operation 210 (FIG. 2) performed by position detection circuitry 128 consistent with the present disclosure is generally illustrated. At operation 302, the position detection circuitry 128 may be configured to receive calibration data associated with each light source 118i-118l. The calibration data may include a light source ID, a propagation delay ($\theta_x$), light source coordinates (x, y, z), and optionally a high frequency ranging OOK signal ($\omega_{ook}$) associated with each light source 118i-118l. The calibration data may be stored in a payload portion of a packet. The position detection circuitry 128 may include a packet processor configured to split the packet contents and store the calibration data in memory (e.g., but not limited to, a buffer associated with the position detection circuitry 128).

At operation 304, the position detection circuitry 128 may be configured to receive electrical signals 132i-132l corresponding to the light signals $S_i$-$S_l$. The electrical signals 132i-132l may be conditioned, for example, to reduce and/or eliminate noise by signal conditioning circuitry 134. At operation 306, the position detection circuitry 128 may be configured to determine four phase difference of arrival (PDOA) pairs ($\phi_{\Delta ji}$, $\phi_{\Delta ki}$, $\phi_{\Delta kj}$, $\phi_{\Delta jl}$) based on the electrical signals 132i-132l. In particular, the position detection circuitry 128 compare the electrical signals 132i-132l to determine the PDOA pairs using any methodology known to those skilled in the art. For example, the position detection circuitry 128 may compare zero point crossing between two electrical signals 132i-132l, slope of rising, and the like. In particular, the position detection circuitry 128 may detect the phase in the time domain by comparing rising edges and/or detect the phase in the frequency domain by using a phase comparator. The PDOA pairs ($\phi_{\Delta ji}$, $\phi_{\Delta ki}$, $\phi_{\Delta kj}$, $\phi_{\Delta lj}$) may be represented as follows:

$$\phi_{\Delta ji} = \omega_{ook}(\tau_j - \tau_i) + (\theta_j - \theta_i) \quad \text{Eq. A}$$

$$\phi_{\Delta ki} = \omega_{ook}(\tau_k - \tau_i) + (\theta_k - \theta_i) \quad \text{Eq. B}$$

$$\phi_{\Delta kj} = \omega_{ook}(\tau_k - \tau_j) + (\theta_k - \theta_j) \quad \text{Eq. C}$$

$$\phi_{\Delta lj} = \omega_{ook}(\tau_l - \tau_j) + (\theta_l - \theta_j) \quad \text{Eq. D}$$

where $\tau_x$ is the propagation delay associated with each light source 118i-118l, and where $\theta_x = \omega_{ook} T_n$ is the phase shift at OOK frequency due to the distribution delay associated with each light source 118i-118l. The derivation of Equations A-D is provided following this discussion.

At operation 308, the position detection circuitry 128 may be configured to determine the phase correction term ($\Phi_{ji}$, $\Phi_{ki}$, $\Phi_{kj}$, $\Phi_{lj}$) for each PDOA pair $\phi_{\Delta ji}$, $\phi_{\Delta ki}$, $\phi_{\Delta kj}$, $\phi_{lj}$). The phase correction terms ($\Phi_{ji}$, $\Phi_{ki}$, $\Phi_{kj}$, $\Phi_{lj}$) may be determined by taking the difference between the distribution phase shift ($\theta_x$) associated with each light source 118i-118l in the PDOA pairs. In other words, each of the phase correction terms ($\Phi_{ji}$, $\Phi_{ki}$, $\Phi_{kj}$, $\Phi_{lj}$) equal ($\theta_x - \theta_y$), which is the left hand portion of Equations A-D. The phase correction terms ($\Phi_{ji}$, $\Phi_{ki}$, $\Phi_{kj}$, $\Phi_{lj}$) may also be considered a differential residual phase error.

At operation 310, the position detection circuitry 128 may be configured to determine the phase corrected PDOA pairs (i.e., ($\phi_{\Delta xy} - \Phi_{xy}$)). In particular, the position detection circuitry 128 may be configured to subtract the phase correction terms ($\Phi_{ji}$, $\Phi_{ki}$, $\Phi_{kj}$, $\Phi_{lj}$) from each associated PDOA pair ($\phi_{\Delta ji}$, $\phi_{\Delta ki}$, $\phi_{\Delta kj}$, $\phi_{\Delta lj}$). Once the phase corrected PDOA pairs ($\Phi_{\Delta xy} - \Phi_{xy}$) are determined, the position detection circuitry 128 may be configured to determine the linear distance differences ($R_{ji}$, $R_{ki}$, $R_{kj}$, $R_{lj}$) at operation 312. In particular, the position detection circuitry 128 may convert the phase corrected PDOA pairs to linear distance differences ($R_{ji}$, $R_{ki}$, $R_{kj}$, $R_{lj}$) using the following relationships:

$$R_{ji} = \frac{(\phi_{\Delta ji} - \Phi_{ji})}{\omega_{ook}} v \quad \text{Eq. E}$$

$$R_{ki} = \frac{(\phi_{\Delta ki} - \Phi_{ki})}{\omega_{ook}} v \quad \text{Eq. F}$$

$$R_{kj} = \frac{(\phi_{\Delta kj} - \Phi_{kj})}{\omega_{ook}} v \quad \text{Eq. G}$$

$$R_{lj} = \frac{(\phi_{\Delta lj} - \Phi_{lj})}{\omega_{ook}} v \quad \text{Eq. H}$$

As may be appreciated, Equations E-H may be derived from Equations A-D. The derivation of Equations E-H is provided following this discussion.

Once the linear distance differences ($R_{ji}$, $R_{ki}$, $R_{kj}$, $R_{lj}$) have been determined, the position detection circuitry 128 may be configured to determine the position of the object 115 based on the linear distance differences ($R_{ji}$, $R_{ki}$, $R_{kj}$, $R_{lj}$). In particular, given the locations of each light source 118i-118l (i.e., $\langle x_i, y_i, z_i \rangle$, $\langle x_j, y_j, z_j \rangle$, $\langle x_k, y_k, z_k \rangle$, $\langle x_l, y_l, z_l \rangle$) as well as the linear distance differences ($R_{ji}$, $R_{ki}$, $R_{kj}$, $R_{lj}$), the position detection circuitry 128 may be configured to determine the receiver location $\langle x, y, z \rangle$ of the object 115 by using the following set of relationships.

$$A = \frac{(R_{ki} x_{ij} - R_{ji} x_{ik})}{(R_{ji} x_{ik} - R_{ki} x_{ij})} \quad \text{Eq. I}$$

$$B = \frac{(R_{ki} z_{ij} - R_{ji} z_{ik})}{(R_{ji} y_{ik} - R_{ki} y_{ij})} \quad \text{Eq. J}$$

$$C = \frac{R_{ki}[-R_{ji}^2 + (x_j^2 - x_i^2) + (y_j^2 - y_i^2) + (z_j^2 - z_i^2)] - R_{ji}[-R_{ki}^2 + (x_k^2 - x_i^2) + (y_k^2 - y_i^2) + (z_k^2 - z_i^2)]}{2(R_{ji} y_{ik} - R_{ki} y_{ij})} \quad \text{Eq. K}$$

$$D = \frac{(R_{lj} x_{jk} - R_{kj} x_{jl})}{(R_{lj} y_{jl} - R_{lj} y_{jk})} \quad \text{Eq. L}$$

$$E = \frac{(R_{lj} z_{jk} - R_{kj} z_{jl})}{(R_{kj} y_{jl} - R_{lj} y_{jk})} \quad \text{Eq. M}$$

$$F = \frac{R_{lj}[-R_{kj}^2 + (x_k^2 - x_j^2) + (y_k^2 - y_j^2) + (z_k^2 - z_j^2)] - R_{kj}[-R_{lj}^2 + (x_l^2 - x_j^2) + (y_l^2 - y_j^2) + (z_l^2 - z_j^2)]}{2(R_{kj} y_{jl} - R_{lj} y_{jk})} \quad \text{Eq. N}$$

$$G = \frac{E - B}{A - D} \quad \text{Eq. O}$$

$$H = \frac{F - C}{A - D} \quad \text{Eq. P}$$

$$I = AG + B \quad \text{Eq. Q}$$

$$J = AH + C \quad \text{Eq. R}$$

$$K = -R_{ki}^2 + (x_k^2 - x_i^2) + (y_k^2 - y_i^2) + (z_k^2 - z_i^2) + 2Hx_{ik} + 2Jy_{ik} \quad \text{Eq. S}$$

$$L = 2[G x_{ik} + I y_{ik} + z_{ik}] \quad \text{Eq. T}$$

$$M = 4 R_{ki}^2 [G^2 + I^2 + 1] - L^2 \quad \text{Eq. U}$$

$$N = 8 R_{ki}^2 [G(H - x_i) + I(J - y_i) - z_i] - 2KL \quad \text{Eq. V}$$

$$O = 4 R_{ki}^2 [(x_i - H)^2 + (y_i - J)^2 + z_i^2] - K^2 \quad \text{Eq. W}$$

$$x = Gz + H \quad \text{Eq. X}$$

$$y = Iz + J \quad \text{Eq. Y}$$

$$z = \frac{-N}{2M} \pm \sqrt{\left(\frac{N}{2M}\right)^2 - \frac{O}{M}} \quad \text{Eq. Z}$$

As may therefore be appreciated, the receiver location <x, y, z> of the object 115 may be represented by Equations X, Y and Z. The position detection circuitry 128 may therefore determine the receiver location <x, y, z> using Equations I-Z. Equations I-Z are based on multilateration equations, the derivation of which is provided following this discussion. Accordingly, the position detection circuitry 128 may be configured to determine the receiver location <x, y, z> of the object 115 based on the electrical signals 132*i*-132*l* (which are representative of the received light signals $S_i$-$S_l$) as well as the calibration data.

As discussed herein, the positioning transmitter system 112 may be configured to transmit calibration data to the positioning receiver system 114. The calibration data may include a distribution phase shift $\theta_x$ associated with each light source 118*i*-118*l*. The distribution phase shift $\theta_x$ associated with each light source 118*i*-118*l* may be determined analytically and/or dynamically. For example, the distribution phase shift $\theta_x$ associated with each light source 118*i*-118*l* may be determined analytically by measuring the length of the source reference frequency distribution lines (e.g., the lengths of the cables connecting the master anchor 120 to each light source 118*i*-118*l*). In particular, the insertion phase of a length of cable used for reference distribution may be measured on a vector network analyzer. The insertion phase may also be calculated based solely on the length of the cable; however, this may require highly accurate knowledge of the cable propagation velocity.

Figure 4:
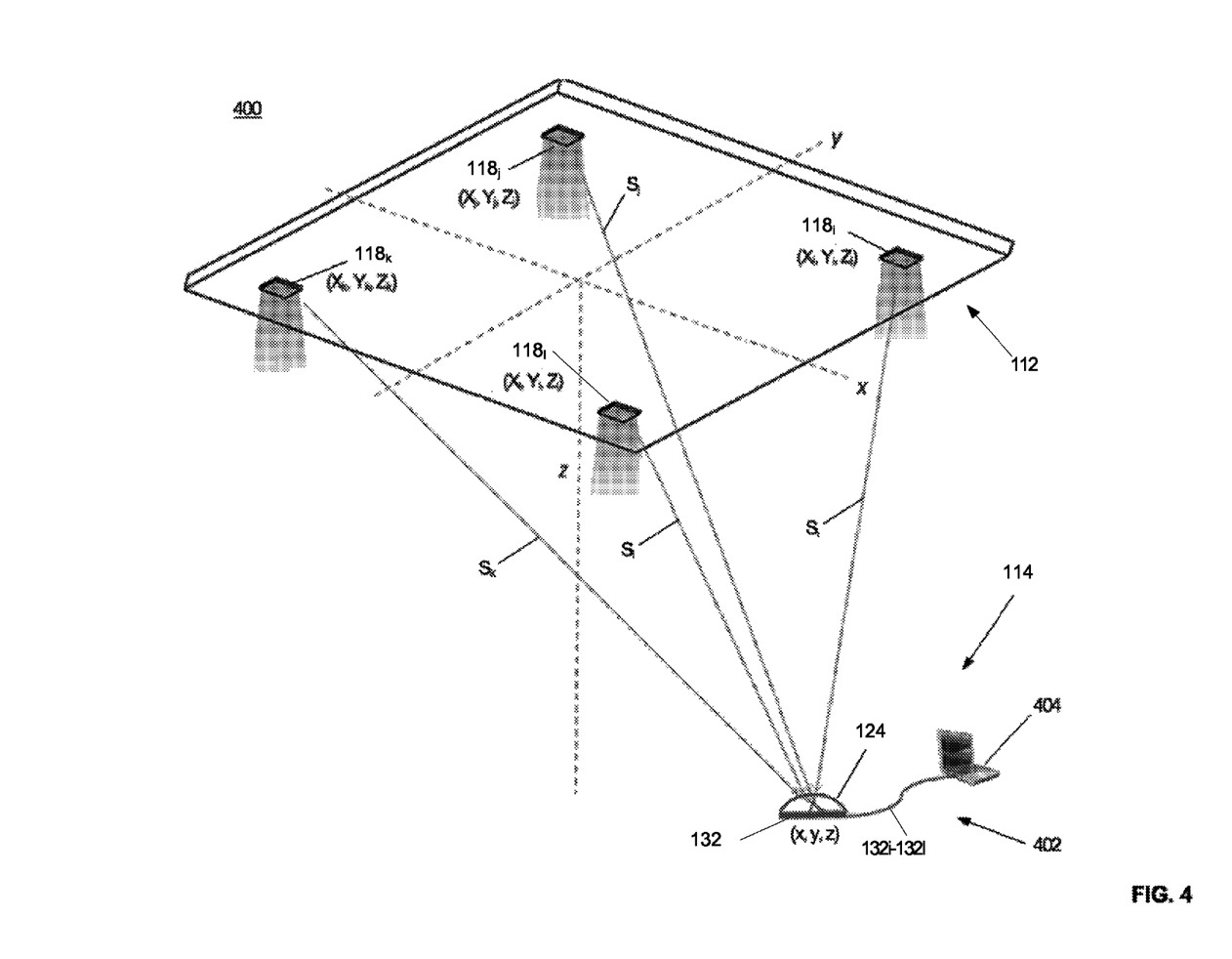
FIG. 4 illustrates one embodiment of a distribution delay detection system.

Dynamically determining the distribution phase shift $\theta_x$ associated with each light source 118*i*-118*l* may be a more robust approach. Turning now to FIG. 4, one embodiment of a distribution phase detection system 400 for dynamically determining the distribution phase $\theta_x$ associated with each light source 118*i*-118*l* is generally illustrated. In particular, a reference receiver system 402 may be placed at a known location <x, y, z> within the confines or parameters (i.e., within the line of sight of four or more light sources 118*i*-118*l*) of the position transmitter system 112. The reference receiver system 402 may be included within the positioning receiver system 114 as shown. For example, the reference receiver system 402 may receive the light signals $S_i$-$S_j$ from the light sources 118*i*-118*l* using the lens 124, the image array 126, and the signal conditioning circuitry 134 of the positioning receiver system 114 (FIG. 1). The reference receiver system 402 may also include a distribution delay phase shift detection circuitry 404 configured to determine the distribution phase $\theta_x$ associated with each light source 118*i*-118*l* by performing the following operations. Those of ordinary skill in the art will recognize, however, that the reference receiver system 402 may be separate and distinct from the positioning receiver system 114 and may include its own lens 124, image array 126, and signal conditioning circuitry 134.

Since the reference receiver system 402 may be placed at a know location <x, y, z>, the propagation delays $\tau_x$ associated with each light source 118*i*-118*l* may be determined As such, any residual phase shift in the received light signals $S_i$-$S_l$ may be considered an error term. The distribution delay detection circuitry 404 may be configured to determine the residual phase shift for each light source 118*i*-118*l* by performing the following operations as illustrated by the flow chart 500 of FIG. 5.

Figure 5:
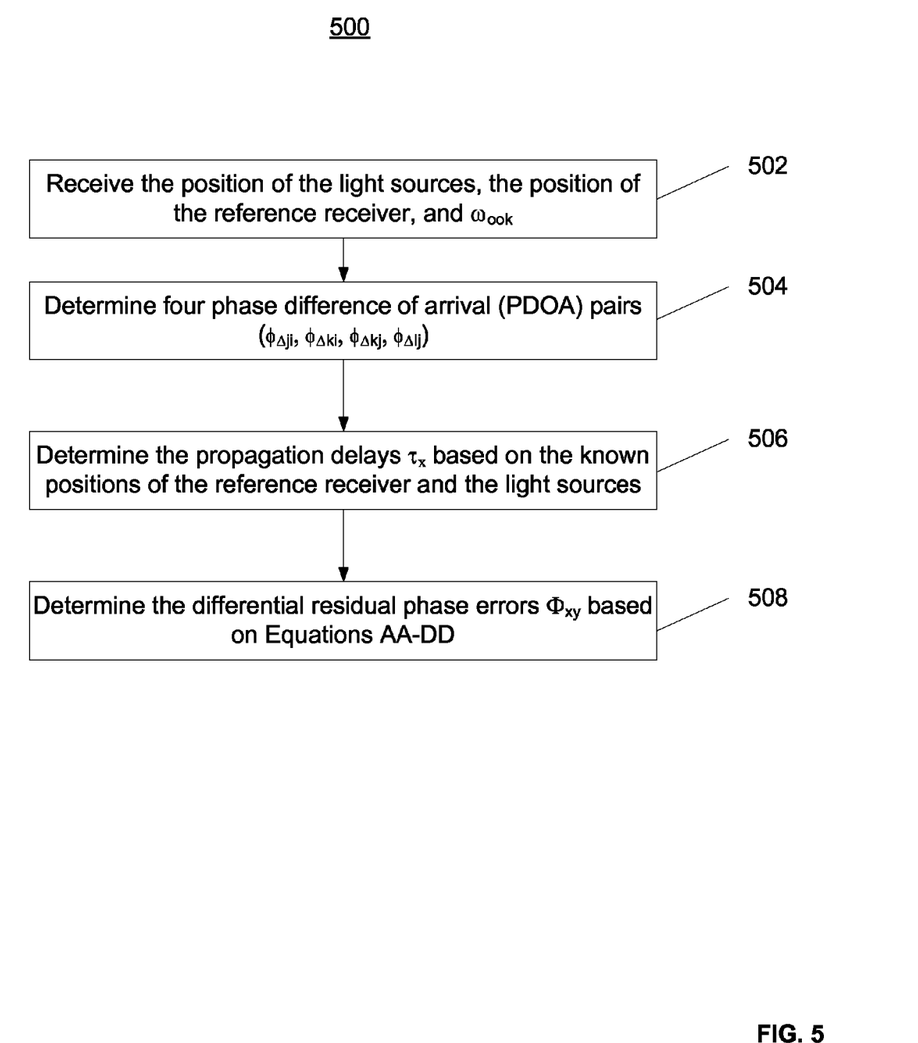
FIG. 5 illustrates a flow chart of example operations for dynamically determining the distribution delay associated with each light source in the positioning system.

In particular, the differential residual phase errors ($\Phi_{ji}$, $\Phi_{ki}$, $\Phi_{kj}$, $\Phi_{lj}$) may be represented as follows.

$$\Phi_{ji} = \phi_{\Delta ji} - \omega_{ook}(\tau_j - \tau_i)$$ Eq. AA $$\Phi_{ji} = \phi_{\Delta ki} - \omega_{ook}(\tau_k - \tau_i)$$ Eq. BB $$\Phi_{kj} = \phi_{\Delta kj} - \omega_{ook}(\tau_k - \tau_j)$$ Eq. CC $$\Phi_{lj} = \phi_{\Delta lj} - \omega_{ook}(\tau_l - \tau_j)$$ Eq. DD Based on Equations AA-DD, the distribution delay detection circuitry 404 may determine the differential residual phase errors $\Phi_{xy}$. It may therefore be appreciated that the distribution delay detection circuitry 404 does not need to determine the absolute phase errors (i.e., $\tau_x$), but rather only the differential residual phase errors $\Phi_{xy}$.

In particular, the position of the light sources 118*i*-118*l*, the position of the reference receiver 402, and $\omega_{ook}$ may be inputted by the user into the distribution delay detection circuitry 404 since these terms are user-defined parameters, operation 502. The distribution delay detection circuitry 404 may determine the PDOA pairs $\phi_{\Delta xy}$ as discussed herein (for example, but not limited to, measuring the zero point crossings of the electrical signals 132*i*-132*l*), operation 504. Additionally, the distribution delay detection circuitry 404 may also be configured to determine the propagation delays $\tau_x$ based on the known position of the reference receiver 402 and the known positions of the light sources 118*i*-118*l* as discussed above, operation 506.

The distribution delay detection circuitry 404 may be further configured to determine the differential residual phase errors $\Phi_{xy}$ based on Equations AA-DD, operation 508. Accordingly, the distribution delay detection system 400 may determine the differential residual phase errors $\Phi_{xy}$ for each pair of light sources 118*i*-118*l*. The differential residual phase errors $\Phi_{xy}$ may then be transmitted to and stored in the positioning transmitter system 112 (FIG. 1), which may later transmit the differential residual phase errors $\Phi_{xy}$ to the positioning receiver system 114 as discussed herein.

Accordingly, at least one embodiment of the positioning system and method consistent with the present disclosure may allow for indoor location based services and may be particularly useful in applications where GPS based location systems cannot reliably operate due to interference from surrounding objects (e.g., roofs) which may block access to the GPS signals. The positioning system and method may be useful for determining the position of a person using a mobile device or an object (e.g., a robotic device). The positioning system and method may therefore leverage overhead lighting systems including, but not limited to, LED based lighting systems.

According to one aspect, there is disclosed a method for determining a coordinate of an object. The method includes receiving calibration data associated with each of at least four light sources; receiving a modulated light signal transmitted from each of the at least four light sources, each of the modulated light signals having a modulation frequency; determining at least four phase difference of arrival (PDOA) pairs based on each of the at least four modulated light signals; determining at least four phase corrected PDOA pairs based, at least in part, on the calibration data and the at least four PDOA pairs; determining at least four linear distance differences based on the at least four phase corrected PDOA pairs; and determining the coordinate of the object based on the at least four linear distance differences and the calibration data.

According to another aspect, there is disclosed a positioning system. The positioning system may include a positioning transmitter system and a positioning receiver system. The positioning transmitter system may include at least four light sources and a master anchor configured to modulate the at least four light sources to emit modulated light signals having a modulation frequency. The positioning receiver system includes a lens, an envelope detector, and positioning detection circuitry. The lens may be configured to focus each of the at least four light signals onto a respective one of a plurality of optical sensors. The envelope detector may be configured to receive at least four sensor output signals from the optical sensors and provide at least four output signals corresponding to the modulation frequency for each of the at least four modulated light signals. The positioning detection circuitry may be configured to receive the at least four output signals from the envelope detector; determine at least four phase difference of arrival (PDOA) pairs based on the at least four output signals; determine at least four phase corrected PDOA pairs based, at least in part, on the calibration data and the at least four PDOA pairs; determine at least four linear distance differences based on the at least four phase corrected PDOA pairs; and determine the coordinate of the object based on the at least four linear distance differences and the calibration data.

According to yet another aspect, there is disclosed an apparatus for determining a coordinate of an object based on at least four modulated light signals emitted from at least four light sources, the modulated light signals each having a modulation frequency. The apparatus may include a positioning receiver system having a lens, an envelope detector, and positioning detection circuitry. The lens may be configured to focus each of the at least four light signals onto a respective one of a plurality of optical sensors. The envelope detector may be configured to receive at least four sensor output signals from the optical sensors and provide at least four output modulation signals corresponding to the modulation frequency for each of the at least four modulated light signals. The positioning detection circuitry may be configured to receive the at least four output signals from the envelope detector; determine at least four phase difference of arrival (PDOA) pairs based on the at least four output signals; determine at least four phase corrected PDOA pairs based, at least in part, on the calibration data and the at least four PDOA pairs; determine at least four linear distance differences based on the at least four phase corrected PDOA pairs; and determine the coordinate of the object based on the at least four linear distance differences and the calibration data.

Derivation of Equations I-Z

The following is an explanation of the derivation of Equations I-Z which are used by the position detection circuitry 128 to determine the position of the object 115. As explained herein, the position detection circuitry 128 may utilize PDOA (which is related to time difference of arrival (TDOA)) to determine a position of the object 115 based on four light signals $S_i$-$S_l$. The TDOA technique is based on the equation for the distance between two points.

$$R = \sqrt{(x_{source} - x_{sink})^2 + (y_{source} - y_{sink})^2 + (z_{source} - z_{sink})^2} \quad \text{Eq. 1}$$

The distance between an emitting source (e.g., light source 118i-118l) and a receiving sink (e.g., positioning receiver system 114) may be determined indirectly by measuring the time it takes for a signal to reach the station from the mobile. Multiplying the TOA t by the signal velocity c results in the distance R. Since the position <x, y, z> of the object 115 (i.e., the receiver position) involves three unknowns, Eq. (1) may be expanded to three equations when the specific locations of three receiving antennas i, j and k are given.

$$ct_i = R_i = \sqrt{(x_i-x)^2+(y_i-y)^2+(z_i-z)^2} \quad \text{Eq. 2}$$

$$ct_j = R_j = \sqrt{(x_j-x)^2+(y_j-y)^2+(z_j-z)^2} \quad \text{Eq. 3}$$

$$ct_k = R_k = \sqrt{(x_k-x)^2+(y_k-y)^2+(z_k-z)^2} \quad \text{Eq. 4}$$

where, $(x_i, y_i, z_i)$; $(x_j, y_j, z_j)$; and $(x_k, y_k, z_k)$ are respectively the position of $i^{th}$, $j^{th}$ and $k^{th}$ sources. Solving three equations (i.e., Eq. 2-4) for three unknowns, however, may not lead to a simple and satisfactory solution because of the square root terms. The solution may be simplified by adding another source for an additional equation.

$$ct_l = R_l = \sqrt{(x_l-x)^2+(y_l-y)^2+(z_l-z)^2} \quad \text{Eq. 5}$$

As such, Eqs. 2-5 may be used to form expressions corresponding to the time difference of arrivals (TDOAs) $R_{ji}$, $R_{ki}$, $R_{kj}$ and $R_{lj}$.

$$R_j - R_i = R_{ji} = c(t_j-t_i) = \sqrt{(x_j-x)^2+(y_j-y)^2+(z_j-z)^2} - \sqrt{(x_i-x)^2+(y_i-y)^2+(z_i-z)^2} \quad \text{Eq. 6}$$

$$R_k - R_i = R_{ki} = c(t_k-t_i) = \sqrt{(x_k-x)^2+(y_k-y)^2+(z_k-z)^2} - \sqrt{(x_i-x)^2+(y_i-y)^2+(z_i-z)^2} \quad \text{Eq. 7}$$

$$R_k - R_j = R_{kj} = c(t_k-t_j) = \sqrt{(x_k-x)^2+(y_k-y)^2+(z_k-z)^2} - \sqrt{(x_j-x)^2+(y_j-y)^2+(z_j-z)^2} \quad \text{Eq. 8}$$

$$R_l - R_j = R_{lj} = c(t_l-t_j) = \sqrt{(x_l-x)^2+(y_l-y)^2+(z_l-z)^2} - \sqrt{(x_j-x)^2+(y_j-y)^2+(z_j-z)^2} \quad \text{Eq. 9}$$

Moving one square root term to the other side results in:

$$R_{ji} + \sqrt{(x_i-x)^2+(y_i-y)^2+(z_i-z)^2} = \sqrt{(x_j-x)^2+(y_j-y)^2+(z_j-z)^2} \quad \text{Eq. 10}$$

$$R_{ki} + \sqrt{(x_i-x)^2+(y_i-y)^2+(z_i-z)^2} = \sqrt{(x_k-x)^2+(y_k-y)^2+(z_k-z)^2} \quad \text{Eq. 11}$$

$$R_{kj} + \sqrt{(x_j-x)^2+(y_j-y)^2+(z_j-z)^2} = \sqrt{(x_k-x)^2+(y_k-y)^2+(z_k-z)^2} \quad \text{Eq. 12}$$

$$R_{lj} + \sqrt{(x_j-x)^2+(y_j-y)^2+(z_j-z)^2} = \sqrt{(x_l-x)^2+(y_l-y)^2+(z_l-z)^2} \quad \text{Eq. 13}$$

Squaring both sides produces the following set of equations:

$$R_{ji}^2 + 2R_{ji}\sqrt{(x_i-x)^2+(y_i-y)^2+(z_i-z)^2} + (x_i-x)^2+(y_i-y)^2+(z_i-z)^2 = (x_j-x)^2+(y_j-y)^2+(z_j-z)^2 \quad \text{Eq. 14}$$

$$R_{ki}^2 + 2R_{ki}\sqrt{(x_i-x)^2+(y_i-y)^2+(z_i-z)^2} + (x_i-x)^2+(y_i-y)^2+(z_i-z)^2 = (x_k-x)^2+(y_k-y)^2+(z_k-z)^2 \quad \text{Eq. 15}$$

$$R_{kj}^2 + 2R_{kj}\sqrt{(x_j-x)^2+(y_j-y)^2+(z_j-z)^2} + (x_j-x)^2+(y_j-y)^2+(z_j-z)^2 = (x_k-x)^2+(y_k-y)^2+(z_k-z)^2 \quad \text{Eq. 16}$$

$$R_{lj}^2 + 2R_{lj}\sqrt{(x_j-x)^2+(y_j-y)^2+(z_j-z)^2} + (x_j-x)^2+(y_j-y)^2+(z_j-z)^2 = (x_l-x)^2+(y_l-y)^2+(z_l-z)^2 \quad \text{Eq. 17}$$

Expanding the squared terms to the left of the square root term produces:

$$R_{ji}^2 + 2R_{ji}\sqrt{(x_i-x)^2+(y_i-y)^2+(z_i-z)^2} + x_i^2 - 2x_ix - x^2 + y_i^2 - 2y_iy - y^2 + z_i^2 - 2z_iz - z^2 = x_j^2 - 2x_jx - x^2 + y_j^2 - 2y_jy - y^2 + z_j^2 - 2z_jz - z^2 \quad \text{Eq. 18}$$

$$R_{ki}^2 + 2R_{ki}\sqrt{(x_i-x)^2+(y_i-y)^2+(z_i-z)^2} + x_i^2 - 2x_ix - x^2 + y_i^2 - 2y_iy - y^2 + z_i^2 - 2z_iz - z^2 = x_k^2 - 2x_kx - x^2 + y_k^2 - 2y_ky - y^2 + z_k^2 - 2z_kz - z^2 \quad \text{Eq. 19}$$

$$R_{kj}^2 + 2R_{kj}\sqrt{(x_j-x)^2+(y_j-y)^2+(z_j-z)^2} + x_j^2 - 2x_jx - x^2 + y_j^2 - 2y_jy - y^2 + z_j^2 - 2z_jz - z^2 = x_k^2 - 2x_kx - x^2 + y_k^2 - 2y_ky - y^2 + z_k^2 - 2z_kz - z^2 \quad \text{Eq. 20}$$

$$R_{lj}^2 + 2R_{lj}\sqrt{(x_j-x)^2+(y_j-y)^2+(z_j-z)^2} + x_j^2 - 2x_jx - x^2 + y_j^2 - 2y_jy - y^2 + z_j^2 - 2z_jz - z^2 = x_l^2 - 2x_lx - x^2 + y_l^2 - 2y_ly - y^2 + z_l^2 - 2z_lz - z^2 \quad \text{Eq. 21}$$

Eliminating the terms $x^2$, $y^2$ and $z^2$ reduces the equation set to $$R_{ji}^2 + 2R_{ji}\sqrt{(x_i-x)^2+(y_i-y)^2+(z_i-z)^2} + x_i^2 - 2x_ix + y_i^2 - 2y_iy + z_i^2 - 2z_iz = x_j^2 - 2x_jx + y_j^2 - 2y_jy + z_j^2 - 2z_jz \quad \text{Eq. 22}$$

$$R_{ki}^2 + 2R_{ki}\sqrt{(x_i-x)^2+(y_i-y)^2+(z_i-z)^2} + x_i^2 - 2x_ix + y_i^2 - 2y_iy + z_i^2 - 2z_iz = x_k^2 - 2x_kx + y_k^2 - 2y_ky + z_k^2 - 2z_kz \quad \text{Eq. 23}$$

$$R_{kj}^2 + 2R_{kj}\sqrt{(x_j-x)^2+(y_j-y)^2+(z_j-z)^2} + x_j^2 - 2x_jx + y_j^2 - 2y_jy + z_j^2 - 2z_jz = x_k^2 - 2x_kx + y_k^2 - 2y_ky + z_k^2 - 2z_kz \quad \text{Eq. 24}$$

$$\frac{R_{ij}^2 + 2R_{ij}}{\sqrt{(x_i-x)^2+(y_i-y)^2+(z_i-z)^2}+x_j^2-2x_jx+y_j^2-2y_jy+z_j^2-2z_jz} = x_i^2-2x_ix+y_i^2-2y_iy+z_i^2-2z_iz \quad \text{Eq. 25}$$

Shifting all but the square root term to the right and combining similar terms produces:

$$\sqrt{(x_i-x)^2+(y_i-y)^2+(z_i-z)^2} = \frac{-R_{ji}^2+(x_j^2-x_i^2)+(y_j^2-y_i^2)+(z_j^2-z_i^2)+2x(x_i-x_j)+2y(y_i-y_j)+2z(z_i-z_j)}{2R_{ji}} \quad \text{Eq. 26}$$

$$\sqrt{(x_i-x)^2+(y_i-y)^2+(z_i-z)^2} = \frac{-R_{ki}^2+(x_k^2-x_i^2)+(y_k^2-y_i^2)+(z_k^2-z_i^2)+2x(x_i-x_k)+2y(y_i-y_k)+2z(z_i-z_k)}{2R_{ki}} \quad \text{Eq. 27}$$

$$\sqrt{(x_j-x)^2+(y_j-y)^2+(z_j-z)^2} = \frac{-R_{kj}^2+(x_k^2-x_j^2)+(y_k^2-y_j^2)+(z_k^2-z_j^2)+2x(x_j-x_k)+2y(y_j-y_k)+2z(z_j-z_k)}{2R_{kj}} \quad \text{Eq. 28}$$

$$\sqrt{(x_j-x)^2+(y_j-y)^2+(z_j-z)^2} = \frac{-R_{lj}^2+(x_l^2-x_j^2)+(y_l^2-y_j^2)+(z_l^2-z_j^2)+2x(x_j-x_l)+2y(y_j-y_l)+2z(z_j-z_l)}{2R_{lj}} \quad \text{Eq. 29}$$

The above equations set can now be simplified by substituting $x_{ij}$ for $x_i$-$x_j$; $y_{ij}$ for $y_i$-$y_j$ and so on.

$$\sqrt{(x_i-x)^2+(y_i-y)^2+(z_i-z)^2} = \frac{-R_{ji}^2+(x_j^2-x_i^2)+(y_j^2-y_i^2)+(z_j^2-z_i^2)+2xx_{ij}+2yy_{ij}+2zz_{ij}}{2R_{ji}} \quad \text{Eq. 30}$$

$$\sqrt{(x_i-x)^2+(y_i-y)^2+(z_i-z)^2} = \frac{-R_{ki}^2+(x_k^2-x_i^2)+(y_k^2-y_i^2)+(z_k^2-z_i^2)+2xx_{ik}+2yy_{ik}+2zz_{ik}}{2R_{ki}} \quad \text{Eq. 31}$$

$$\sqrt{(x_j-x)^2+(y_j-y)^2+(z_j-z)^2} = \frac{-R_{kj}^2+(x_k^2-x_j^2)+(y_k^2-y_j^2)+(z_k^2-z_j^2)+2xx_{jk}+2yy_{jk}+2zz_{jk}}{2R_{kj}} \quad \text{Eq. 32}$$

$$\sqrt{(x_j-x)^2+(y_j-y)^2+(z_j-z)^2} = \frac{-R_{lj}^2+(x_l^2-x_j^2)+(y_l^2-y_j^2)+(z_l^2-z_j^2)+2xx_{jl}+2yy_{jl}+2zz_{jl}}{2R_{lj}} \quad \text{Eq. 33}$$

Equations (6)-(9) are now in a useful arrangement. Equations (30)-(33), when squared, are intersecting hyperboloids. By equating Eqs. (30) and (31) to form Eq. (34), we can derive a plane equation in the form of y=Ax+By+C by rearranging the terms as shown in Eqs. (35) and (39).

Equating 30 and 31:

$$\frac{-R_{ji}^2+(x_j^2-x_i^2)+(y_j^2-y_i^2)+(z_j^2-z_i^2)+2xx_{ij}+2yy_{ij}+2zz_{ij}}{2R_{ji}} = \frac{-R_{ki}^2+(x_k^2-x_i^2)+(y_k^2-y_i^2)+(z_k^2-z_i^2)+2xx_{ik}+2yy_{ik}+2zz_{ik}}{2R_{ki}} \quad \text{Eq. 34}$$

Rewriting:

$$\frac{R_{ki}[-R_{ji}^2+(x_j^2-x_i^2)+(y_j^2-y_i^2)+(z_j^2-z_i^2)]}{2} + R_{ki}(xx_{ij}+yy_{ij}+zz_{ij}) = \frac{R_{ji}[-R_{ki}^2+(x_k^2-x_i^2)+(y_k^2-y_i^2)+(z_k^2-z_i^2)]}{2} + R_{ji}(xx_{ik}+yy_{ik}+zz_{ik}) \quad \text{Eq. 35}$$

Then:

$$\frac{R_{ki}[-R_{ji}^2+(x_j^2-x_i^2)+(y_j^2-y_i^2)+(z_j^2-z_i^2)] - R_{ji}[-R_{ki}^2+(x_k^2-x_i^2)+(y_k^2-y_i^2)+(z_k^2-z_i^2)]}{2} = +R_{ji}(xx_{ik}+yy_{ik}+zz_{ik}) - R_{ki}(xx_{ij}+yy_{ij}+zz_{ij}) \quad \text{Eq. 36}$$

Then:

$$x(R_{ji}x_{ik}-R_{ki}x_{ij})+y(R_{ji}y_{ik}-R_{ki}y_{ij})+z(R_{ji}z_{ik}-R_{ki}z_{ij}) = \frac{R_{ki}[-R_{ji}^2+(x_j^2-x_i^2)+(y_j^2-y_i^2)+(z_j^2-z_i^2)] - R_{ji}[-R_{ki}^2+(x_k^2-x_i^2)+(y_k^2-y_i^2)+(z_k^2-z_i^2)]}{2} \quad \text{Eq. 37}$$

Then:

$$y(R_{ji}y_{ik}-R_{ki}y_{ij}) = -x(R_{ji}x_{ik}-R_{ki}x_{ij})-z(R_{ji}z_{ik}-R_{ki}z_{ij}) + \frac{R_{ki}[-R_{ji}^2+(x_j^2-x_i^2)+(y_j^2-y_i^2)+(z_j^2-z_i^2)] - R_{ji}[-R_{ki}^2+(x_k^2-x_i^2)+(y_k^2-y_i^2)+(z_k^2-z_i^2)]}{2} \quad \text{Eq. 38}$$

$$y = x\frac{(-R_{ji}x_{ik}+R_{ki}x_{ij})}{(R_{ji}y_{ik}-R_{ki}y_{ij})} + z\frac{(-R_{ji}z_{ik}+R_{ki}z_{ij})}{(R_{ji}y_{ik}-R_{ki}y_{ij})} + \frac{R_{ki}[-R_{ji}^2+(x_j^2-x_i^2)+(y_j^2-y_i^2)+(z_j^2-z_i^2)] - R_{ji}[-R_{ki}^2+(x_k^2-x_i^2)+(y_k^2-y_i^2)+(z_k^2-z_i^2)]}{2(R_{ji}y_{ik}-R_{ki}y_{ij})} \quad \text{Eq. 39}$$

Equation (39) is now in the desired form of a plane equation:

$$y = Ax + Bz + C \quad \text{Eq. 40}$$

where:

$$A = \frac{(R_{ki}x_{ij}-R_{ji}x_{ik})}{(R_{ji}y_{ik}-R_{ki}y_{ij})} \quad \text{Eq. 41}$$

(which corresponds to Eq. I discussed above)
and $$B = \frac{(R_{ki}z_{ij} - R_{ji}z_{ik})}{(R_{ji}y_{ik} - R_{ki}y_{ij})} \qquad \text{Eq. 42}$$

(which corresponds to Eq. J discussed above)
and $$C = \frac{R_{ki}[-R_{ji}^2 + (x_j^2 - x_i^2) + (y_j^2 - y_i^2) + (z_j^2 - z_i^2)] - R_{ji}[-R_{ki}^2 + (x_k^2 - x_i^2) + (y_k^2 - y_i^2) + (z_k^2 - z_i^2)]}{2(R_{ji}y_{ik} - R_{ki}y_{ij})} \qquad \text{Eq. 43}$$

(which corresponds to Eq. K discussed above)

Similarly, equating Eqs. (32) and (33) produces a second plane equation $y=Dx+Ez+F$.

Equating 32 and 33:

$$\frac{-R_{kj}^2 + (x_k^2 - x_j^2) + (y_k^2 - y_j^2) + (z_k^2 - z_j^2) + 2xx_{jk} + 2yy_{jk} + 2zz_{jk}}{2R_{kj}} = \frac{-R_{lj}^2 + (x_l^2 - x_j^2) + (y_l^2 - y_j^2) + (z_l^2 - z_j^2) + 2xx_{jl} + 2yy_{jl} + 2zz_{jl}}{2R_{lj}} \qquad \text{Eq. 44}$$

Rewriting:

$$\frac{R_{lj}[-R_{kj}^2 + (x_k^2 - x_j^2) + (y_k^2 - y_j^2) + (z_k^2 - z_j^2)]}{2} + R_{lj}(xx_{jk} + yy_{jk} + zz_{jk}) = \frac{R_{kj}[-R_{lj}^2 + (x_l^2 - x_j^2) + (y_l^2 - y_j^2) + (z_l^2 - z_j^2)]}{2} + R_{kj}(xx_{jl} + yy_{jl} + zz_{jl}) \qquad \text{Eq. 45}$$

Then:

$$\frac{R_{lj}[-R_{kj}^2 + (x_k^2 - x_j^2) + (y_k^2 - y_j^2) + (z_k^2 - z_j^2)] - R_{kj}[-R_{lj}^2 + (x_l^2 - x_j^2) + (y_l^2 - y_j^2) + (z_l^2 - z_j^2)]}{2} = +R_{kj}(xx_{jl} + yy_{jl} + zz_{jl}) - R_{lj}(xx_{jk} + yy_{jk} + zz_{jk}) \qquad \text{Eq. 46}$$

Then:

$$x(R_{kj}x_{jl} - R_{lj}x_{jk}) + y(R_{kj}y_{jl} - R_{lj}y_{jk}) + z(R_{kj}z_{jl} - R_{lj}z_{jk}) = \frac{R_{lj}[-R_{kj}^2 + (x_k^2 - x_j^2) + (y_k^2 - y_j^2) + (z_k^2 - z_j^2)] - R_{kj}[-R_{lj}^2 + (x_l^2 - x_j^2) + (y_l^2 - y_j^2) + (z_l^2 - z_j^2)]}{2} \qquad \text{Eq. 47}$$

Then:

$$y(R_{kj}y_{jl} - R_{lj}y_{jk}) = -x(R_{kj}x_{jl} - R_{lj}x_{jk}) - z(R_{kj}z_{jl} - R_{lj}z_{jk}) + \frac{R_{lj}[-R_{kj}^2 + (x_k^2 - x_j^2) + (y_k^2 - y_j^2) + (z_k^2 - z_j^2)] - R_{kj}[-R_{lj}^2 + (x_l^2 - x_j^2) + (y_l^2 - y_j^2) + (z_l^2 - z_j^2)]}{2} \qquad \text{Eq. 48}$$

$$y = x\frac{(-R_{kj}x_{jl} + R_{lj}x_{jk})}{(R_{kj}y_{jl} - R_{lj}y_{jk})} + z\frac{(-R_{kj}z_{jl} + R_{lj}z_{jk})}{(R_{kj}y_{jl} - R_{lj}y_{jk})} + \frac{R_{lj}[-R_{kj}^2 + (x_k^2 - x_j^2) + (y_k^2 - y_j^2) + (z_k^2 - z_j^2)] - R_{kj}[-R_{lj}^2 + (x_l^2 - x_j^2) + (y_l^2 - y_j^2) + (z_l^2 - z_j^2)]}{2(R_{kj}y_{jl} - R_{lj}y_{jk})} \qquad \text{Eq. 49}$$

Equation (49) is now in the desired form of a plane equation:

$$y=Dx+Ez+F \qquad \text{Eq. 50}$$

where:

$$D = \frac{(R_{lj}x_{jk} - R_{kj}x_{jl})}{(R_{kj}y_{jl} - R_{lj}y_{jk})} \qquad \text{Eq. 51}$$

(which corresponds to Eq. L discussed above)
and $$E = \frac{(R_{lj}z_{jk} - R_{kj}z_{jl})}{(R_{kj}y_{jl} - R_{lj}y_{jk})} \qquad \text{Eq. 52}$$

(which corresponds to Eq. M discussed above)
and $$F = \frac{R_{lj}[-R_{kj}^2 + (x_k^2 - x_j^2) + (y_k^2 - y_j^2) + (z_k^2 - z_j^2)] - R_{kj}[-R_{lj}^2 + (x_l^2 - x_j^2) + (y_l^2 - y_j^2) + (z_l^2 - z_j^2)]}{2(R_{kj}y_{jl} - R_{lj}y_{jk})} \qquad \text{Eq. 53}$$

(which corresponds to Eq. N discussed above)

Equating the plane Eqs. (40) and (50) produces a linear equation for x in terms of z.

$$Ax+Bz+C=Dx+Ez+F \qquad \text{Eq. 54}$$

Solving for x $$x=Gz+H \qquad \text{Eq. 55}$$

(which corresponds to Eq. X discussed above)
where:

$$G = \frac{E - B}{A - D} \qquad \text{Eq. 56}$$

(which corresponds to Eq. O discussed above)
and $$H = \frac{F - C}{A - D} \qquad \text{Eq. 57}$$

(which corresponds to Eq. P discussed above)

Substituting Eq. (55) back into Eq. (40) produces a linear equation for y in terms of z.

$$y = A(Gz+H) + Bz + C = Iz + J \quad \text{Eq. 58}$$

(which corresponds to Eq. Y discussed above)
Where $$I = AG + B \quad \text{Eq. 59}$$

(which corresponds to Eq. Q discussed above)
and $$J = AH + C \quad \text{Eq. 60}$$

(which corresponds to Eq. R discussed above)
Equations (55) and (58) are now substituted back into Eq. (31) to derive the position z.

$$2R_{ki}\sqrt{(x_i - Gz - H)^2 + (y_i - Iz - J)^2 + (z_i - z)^2} = -R_{ki}^2 + (x_k - x_i^2) + (y_k^2 - y_i^2) + (z_k^2 - z_i^2) + 2(Gz+H)x_{ik} + 2(Iz+J)y_{ik} + 2zz_{ik} \quad \text{Eq. 62}$$

$$2R_{ki}\sqrt{\begin{array}{l}x_i^2 + G^2z^2 + H^2 - 2x_iGz - 2x_iH + 2GHz + y_i^2 + \\ I^2z^2 + J^2 - 2y_iIz - 2y_iJ + 2IJz + z_i^2 - 2z_iz + z^2\end{array}} =$$
$$-R_{ki}^2 + (x_k^2 - x_i^2) + (y_k^2 - y_i^2) + (z_k^2 - z_i^2) +$$
$$2(Gz+H)x_{ik} + 2(Iz+J)y_{ik} + 2zz_{ik}$$

Let $$K = -R_{ki}^2 + (x_k^2 - x_i^2) + (y_k^2 - y_i^2) + (z_k^2 - z_i^2) + 2Hx_{ik} + 2Jy_{ik} \quad \text{Eq. 63}$$

(which corresponds to Eq. S discussed above)
and $$L = 2[Gx_{ik} + Iy_{ik} + z_{ik}] \quad \text{Eq. 64}$$

(which corresponds to Eq. T discussed above)
As a result, one may arrive at:

$$2R_{ki}\sqrt{\begin{array}{l}x_i^2 + G^2z^2 + H^2 - 2x_iGz - 2x_iH + 2GHz + y_i^2 + \\ I^2z^2 + J^2 - 2y_iIz - 2y_iJ + 2IJz + z_i^2 - 2z_iz + z^2\end{array}} = Lz + K \quad \text{Eq. 65}$$

Next $$4R_{ki}^2[x_i^2 + G^2z^2 + H^2 - 2x_iGz - 2x_iH + 2GHz + y_i^2 + I^2z^2 + J^2 - 2y_iIz - 2y_iJ + 2IJz + z_i^2 - 2z_iz + z^2] = L^2z^2 + 2KLz + K^2 \quad \text{Eq. 66}$$

$$4R_{ki}^2[x_i^2 + H^2 - 2x_iH + y_i^2 + J^2 - 2y_iJ + z_i^2] - 4R_{ki}^2[-2x_iG + 2GH - 2y_iJ + 2IJ - 2z_i]z + 4R_{ki}^2[G^2 + I^2 + 1]z^2 = L^2z^2 + 2KLz + K^2 \quad \text{Eq. 67}$$

To obtain z, Eq. (67) is rearranged into a binomial equation.

$$Mz^2 + Nz + O = 0 \quad \text{Eq. 68}$$

Where $$M = 4R_{ki}^2[G^2 + I^2 + 1] - L^2 \quad \text{Eq. 69}$$

(which corresponds to Eq. U discussed above)
and $$N = 8R_{ki}^2[-x_iG + GH - y_iI + IJ'_i] - 2KL = 8R_{ki}^2[G(H - x_i) + I(J - y_i) - z_i]2KL \quad \text{Eq. 70}$$

(which corresponds to Eq. V discussed above)
and $$O = 4R_{ki}^2[x_i^2 + H^2 - 2x_iH) + (y_i^2 + J^2 - 2y_iJ) + z_i^2] - K^2 = 4R_{ki}^2[(x_i - H)^2 + (y_i - J)^2 + z_i^2] - K^2 \quad \text{Eq. 71}$$

(which corresponds to Eq. W discussed above)

The solution for z is then given by:

$$z = \frac{-N}{2M} \pm \sqrt{\left(\frac{N}{2M}\right)^2 - \frac{O}{M}} \quad \text{Eq. 72}$$

(which corresponds to Eq. X discussed above)

The z coordinate can be put back into the linear Eqs. (55) and (58) to solve for the coordinates x and y.

Derivation of Equations A-D

As discussed herein, each of the light sources $S_i$-$S_l$ may be modulated with a precise frequency ON/OFF keying waveform. The frequency reference for all the sources is common with random distribution time delay. The position detection circuitry 128 may be configured to determine positioning via tones where the phase delta between two tones is processed to determine the difference in propagation time delay. The baseband ranging waveform starts as a continuous wave (CW) radio frequency (RF) tone that is amplitude modulated (AM) (ON/OFF keying) onto a "carrier signal" at frequency $\omega_c$, which (as discussed herein) may be visible light with a frequency of about 500 THz. The signal received at a particular pixel 132i-132l in the image array 126, due to a modulated source, is given as:

$$s_n(t) = A_n(1 + m \cdot \cos(\omega_{ook}(t+\tau_n) + \theta_n))\cos(\omega_C(t+\tau_n) + \theta_C) \quad \text{Eq. 73}$$

where $s_n(t)$ is the signal at the receiver 114 due to the modulation by the $n^{th}$ source, m is the modulation index $(0 < m \leq 1)$, $A_n$ is the attenuation of the $n^{th}$ propagation path with propagation time delay $\tau_n$, and $\omega_{ook}$ is the (On-Off-Keying) OOK frequency with a starting phase of $\theta_k$.

The receiver 114 may include signal conditioning circuitry 134, including a non-coherent envelope detector. The envelope is then given as $$s_n(t) = A_n \cdot m \cdot \cos(\omega_{ook}(t+\tau_{ook}) + \theta_n). \quad \text{Eq. 74}$$

This can be expressed more conveniently using upper sideband complex sinusoids (i.e. digital signal processing) as:

$$S_n(t) = \frac{A_n}{2} \cdot m \cdot e^{j\{\omega_{ook}(t+\tau_n)+\theta_n\}}. \quad \text{Eq. 75}$$

The complex signals at the receiver due to the sources is given as:

$$S_i(t) = \frac{A_i}{2} \cdot m \cdot e^{j\{\omega_{ook}(t+\tau_i)+\theta_i\}} \quad \text{Eq. 76}$$

$$S_j(t) = \frac{A_j}{2} \cdot m \cdot e^{j\{\omega_{ook}(t+\tau_j)+\theta_j\}} \quad \text{Eq. 77}$$

$$S_k(t) = \frac{A_k}{2} \cdot m \cdot e^{j\{\omega_{ook}(t+\tau_k)+\theta_k\}} \quad \text{Eq. 78}$$

$$S_l(t) = \frac{A_l}{2} \cdot m \cdot e^{j\{\omega_{ook}(t+\tau_l)+\theta_l\}}. \quad \text{Eq. 79}$$

where $\theta_x$ is a residual phase error term attributed to the distribution phase and any other residual phase shift (i.e. such as due to filtering).

The PDOA can be determined in multiple pairs. The position detection circuitry 128 only needs to determine four PDOA pairs:

$$s_j(t)\cdot conj(s_i(t)) = \frac{A_j A_i}{4}\cdot m^2 \cdot e^{j\{\omega_{ook}(t+\tau_j)+\theta_j\}} e^{-j\{\omega_{ook}(t+\tau_i)+\theta_i\}} = \quad \text{Eq. 80}$$

$$\frac{A_j A_i}{4}\cdot m^2 \cdot e^{j\{\omega_{ook}(\tau_j-\tau_i)+(\theta_j-\theta_i)\}} \Rightarrow$$

$$\phi_{\Delta ji} \equiv \omega_{ook}(\tau_j - \tau_i) + (\theta_j - \theta_i)$$

(which corresponds to Eq. A discussed above)

$$s_k(t)\cdot conj(s_i(t)) = \frac{A_k A_i}{4}\cdot m^2 \cdot e^{j\{\omega_{ook}(t+\tau_k)+\theta_k\}} e^{-j\{\omega_{ook}(t+\tau_i)+\theta_i\}} = \quad \text{Eq. 81}$$

$$\frac{A_k A_i}{4}\cdot m^2 \cdot e^{j\{\omega_{ook}(\tau_k-\tau_i)+(\theta_k-\theta_i)\}} \Rightarrow$$

$$\phi_{\Delta ki} \equiv \omega_{ook}(\tau_k - \tau_i) + (\theta_k - \theta_i)$$

(which corresponds to Eq. B discussed above)

$$s_k(t)\cdot conj(s_j(t)) = \frac{A_k A_j}{4}\cdot m^2 \cdot e^{j\{\omega_{ook}(t+\tau_k)+\theta_k\}} e^{-j\{\omega_{ook}(t+\tau_j)+\theta_j\}} = \quad \text{Eq. 82}$$

$$\frac{A_k A_j}{4}\cdot m^2 \cdot e^{j\{\omega_{ook}(\tau_k-\tau_j)+(\theta_k-\theta_j)\}} \Rightarrow$$

$$\phi_{\Delta kj} \equiv \omega_{ook}(\tau_k - \tau_j) + (\theta_k - \theta_j)$$

(which corresponds to Eq. C discussed above)

$$s_l(t)\cdot conj(s_j(t)) = \frac{A_l A_j}{4}\cdot m^2 \cdot e^{j\{\omega_{ook}(t+\tau_l)+\theta_l\}} e^{-j\{\omega_{ook}(t+\tau_j)+\theta_j\}} = \quad \text{Eq. 83}$$

$$\frac{A_l A_j}{4}\cdot m^2 \cdot e^{j\{\omega_{ook}(\tau_l-\tau_j)+(\theta_l-\theta_j)\}} \Rightarrow$$

$$\phi_{\Delta lj} \equiv \omega_{ook}(\tau_l - \tau_j) + (\theta_l - \theta_j)$$

(which corresponds to Eq. D discussed above)

Embodiments of the methods described herein may be implemented in a system that includes one or more storage mediums having stored thereon, individually or in combination, instructions that when executed by one or more processors perform the methods. Here, the processor may include, for example, a central processing unit and/or programmable circuitry. Thus, it is intended that operations according to the methods described herein may be distributed across a plurality of physical devices. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage media may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A method for determining a coordinate of an object, said method comprising:
   receiving, at a positioning receiver system coupled to said object, calibration data from a positioning transmitter system associated with each of at least four light sources;
   receiving, at said positioning receiver system, a modulated light signal transmitted from each of said at least four light sources of said positioning transmitter system, each of said modulated light signals having a modulation frequency and wherein each of said at least four light sources emit light having a wavelength in the visible light spectrum;
   determining, at said positioning receiver system, at least four phase difference of arrival (PDOA) pairs based on each of said at least four modulated light signals;
   determining, at said positioning receiver system, at least four phase corrected PDOA pairs based, at least in part, on said calibration data and said at least four PDOA pairs;
   determining, at said positioning receiver system, at least four linear distance differences based on said at least four phase corrected PDOA pairs; and
   determining, at said positioning receiver system, said coordinate of said object based on said at least four linear distance differences and said calibration data.

2. The method of claim 1, further comprising transmitting said calibration data from each of said at least four light sources.

3. The method of claim 2, wherein said calibration data transmitted from each of said at least four light sources comprises a source identifier uniquely identifying a respective one of said light sources, a distribution phase shift associated with said respective one of said light sources, and a location of said respective one of said light sources.

4. The method of claim 1, further comprising modulating each of said at least four light sources, wherein said modulation frequency greater than 10 MHz.

5. The method of claim 4, wherein said calibration data further comprises a modulation frequency associated with each of said at least four modulated light signals.

6. The method of claim 1, further comprising:
   focusing each of said at least four modulated light signals onto a unique one of a plurality of pixels of an image array using a lens;

providing output signals from said image array corresponding to said modulation frequency for each of said at least four modulated light signals;
wherein said output signals are used to determine said at least four PDOA pairs.

7. The method of claim 1, further comprising determining a phase correction term for each of said at least four PDOA pairs.

8. The method of claim 7, wherein determining said phase correction term for each of said at least four PDOA pairs further comprises:
positioning a reference receiver system at a known location with respect to said at least four light sources;
providing position information to said reference receiver system for each of said at least four light sources;
receiving, at said reference receiver system, said at least four modulated light signals transmitted from each of said at least four light sources;
determining at least four PDOA pairs based on said at least four modulated light signals;
determining a propagation delay associated with each of said at least four PDOA pairs based on said known position of said reference receiver system; and
determining said at least four phase correction terms for each of said at least four PDOA pairs based on said at least four propagation delays, said at least four PDOA pairs, and said known modulation frequency of said at least four modulated light signals.

9. A positioning system comprising:
a positioning transmitter system comprising:
at least four light sources each configured to emit light having a wavelength in the visible light spectrum; and
a master anchor configured to modulate said at least four light sources such that each of said at least four light sources emits modulated light signals at a modulation frequency; and
a positioning receiver system configured to be coupled to said object, said positioning receiver system comprising:
a lens configured to focus each of said at least four modulated light signals onto a respective one of a plurality of optical sensors;
an envelope detector configured to receive at least four sensor output signals from said optical sensors corresponding to said at least four modulated light signals and provide at least four output signals corresponding to said modulation frequency for each of said at least four modulated light signals; and
positioning detection circuitry, said positioning detection circuitry configured to:
receive calibration data associated with each of said at least four modulated light sources;
determine at least four phase difference of arrival (PDOA) pairs based on said at least four output signals from said envelope detector;
determine at least four phase corrected PDOA pairs based, at least in part, on said calibration data and said at least four PDOA pairs;
determine at least four linear distance differences based on said at least four phase corrected PDOA pairs; and
determine said coordinate of said object based on said at least four linear distance differences and said calibration data.

10. The system of claim 9, wherein said at least four light sources comprise light emitting diode (LED) lights.

11. The system of claim 10, wherein said modulation frequency of said at least four modulated light signals is each greater than about 10 MHz.

12. The system of claim 11, wherein each of said at least four light sources is configured to transmit said calibration data.

13. The system of claim 12, wherein said calibration data transmitted from each of said at least four light sources comprises a source identifier uniquely identifying a respective one of said at least four light sources, a distribution phase shift associated with said respective one of said at least four light sources, and a location of said respective one of said at least four light sources.

14. The system of claim 13, wherein said calibration data further comprises said modulation frequency associated with each of said at least four modulated light signals.

15. The system of claim 9, wherein said positioning detection circuitry is further configured to determine a phase correction term for each of said at least four PDOA pairs.

16. An apparatus for determining a coordinate of an object based on at least four modulated light signals emitted from at least four light sources configured to emit light having a wavelength in the visible light spectrum, said modulated light signals each having a modulation frequency, said apparatus comprising:
a positioning receiver system configured to be coupled to said object, said positioning receiver system comprising:
a lens configured to focus each of said at least four modulated light signals onto a respective one of a plurality of optical sensors;
an envelope detector configured to receive at least four sensor output signals from said optical sensors corresponding to said at least four modulated light signals and provide at least four output signals corresponding to said modulation frequency for each of said at least four modulated light signals; and
positioning detection circuitry, said positioning detection circuitry configured to:
receive calibration data associated with each of said at least four light sources;
determine at least four phase difference of arrival (PDOA) pairs based on said at least four output signals from said envelope detector;
determine at least four phase corrected PDOA pairs based, at least in part, on said calibration data and said at least four PDOA pairs;
determine at least four linear distance differences based on said at least four phase corrected PDOA pairs; and
determine said coordinate of said object based on said at least four linear distance differences and said calibration data.

17. The apparatus of claim 16, wherein said positioning receiver system is included in a mobile device.

18. The apparatus of claim 16, wherein said positioning receiver system is included in a robotic device.

19. The apparatus of claim 16, wherein said calibration data transmitted from each of said at least four light sources comprises a source identifier uniquely identifying a respective one of said at least four light sources, a distribution phase shift associated with said respective one of said at least four light sources, and a location of said respective one of said at least four light sources.

20. The apparatus of claim 16, wherein said positioning detection circuitry is further configured to determine a phase correction term for each of said at least four PDOA pairs.

* * * * *